United States Patent
Chalaud (10) Patent No.: US 10,465,910 B2
(45) Date of Patent: Nov. 5, 2019

(54) MULTI-POINT INJECTION DEVICE FOR AN AIRCRAFT ENGINE

(71) Applicant: SAFRAN AIRCRAFT ENGINES, Paris (FR)

(72) Inventor: Sebastien Chalaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 395 days.

(21) Appl. No.: 15/037,736

(22) PCT Filed: Nov. 20, 2014

(86) PCT No.: PCT/FR2014/052980
§ 371 (c)(1),
(2) Date: May 19, 2016

(87) PCT Pub. No.: WO2015/075389
PCT Pub. Date: May 28, 2015

(65) Prior Publication Data
US 2016/0298850 A1 Oct. 13, 2016

(30) Foreign Application Priority Data
Nov. 20, 2013 (FR) ..................................... 13 61428

(51) Int. Cl.
*F23R 3/34* (2006.01)
*F02C 7/228* (2006.01)
(Continued)

(52) U.S. Cl.
CPC ................ *F23R 3/34* (2013.01); *F02C 7/228* (2013.01); *F02C 7/232* (2013.01); *F02C 9/34* (2013.01);
(Continued)

(58) Field of Classification Search
CPC .. F02C 7/228; F02C 7/232; F02C 9/34; F23R 3/28; F23R 3/34; F23D 2900/30;
(Continued)

(56) References Cited

U.S. PATENT DOCUMENTS 6,050,081 A * 4/2000 Jansen ..................... F02C 7/232
137/112
8,104,258 B1 * 1/2012 Jansen ..................... F02C 7/232
137/240

(Continued)

OTHER PUBLICATIONS

International Search Report dated Jan. 30, 2015 in PCT/FR2014/052980 filed Nov. 20, 2014.

(Continued)

*Primary Examiner* — Carlos A Rivera
(74) *Attorney, Agent, or Firm* — Oblon, McClelland, Maier & Neustadt, L.L.P.

(57) ABSTRACT

A multi-point fuel injection device for an aircraft engine, including an inlet line, at least two injection lines, and a purge line, a fuel distributor member connected to each line and including a moveable element which includes an injection passage, in which the moveable element additionally includes a purge passage, and is configured to adopt a first range of positions in which the injection passage interconnects the inlet line and the injection lines, and a second range of positions in which the injection passage interconnects the inlet line and at least a first injection line while the purge passage interconnects the purge line and at least a second injection line, the device additionally includes an actuator adapted to move the moveable element into a safety position when a failure of the distribution member is detected, the injection passage interconnecting, in this safety position of the moveable element, the inlet line and the first injection line while the purge passage does not interconnect the purge line to any of the injection lines.

16 Claims, 5 Drawing Sheets

(51) Int. Cl.
F02C 7/232 (2006.01)
F02C 9/34 (2006.01)
F23K 5/06 (2006.01)
F23D 11/00 (2006.01)

(52) U.S. Cl.
CPC ............... F23D 11/00 (2013.01); F23K 5/06 (2013.01); F23D 2209/30 (2013.01); F23K 2203/105 (2013.01); F23K 2301/203 (2013.01)

(58) Field of Classification Search
CPC ............... F23D 2209/30; F23K 5/147; F23K 2203/105; F23K 2301/206
See application file for complete search history.

(56) References Cited

U.S. PATENT DOCUMENTS

| | | | | |
|---|---|---|---|---|
| 8,429,892 | B2* | 4/2013 | Tentorio | F02C 7/232 137/112 |
| 2007/0245744 | A1 | 10/2007 | Dooley | |
| 2010/0199681 | A1 | 8/2010 | Dooley | |
| 2012/0159953 | A1* | 6/2012 | Griffiths | F02C 7/228 60/734 |
| 2013/0042920 | A1 | 2/2013 | Snodgrass et al. | |
| 2013/0283763 | A1* | 10/2013 | Podgorski | F02C 7/232 60/39.281 |
| 2014/0076435 | A1* | 3/2014 | Ballard | F16K 11/0712 137/565.11 |
| 2014/0245739 | A1 | 9/2014 | Dooley | |
| 2014/0245745 | A1 | 9/2014 | Dooley | |

OTHER PUBLICATIONS

French Preliminary Search Report dated May 20, 2014 in Patent Application No. FR 1361428 (with English Translation of categories of cited documents).

* cited by examiner

MULTI-POINT INJECTION DEVICE FOR AN AIRCRAFT ENGINE

GENERAL FIELD

The invention relates to the field of fuel injectors, and more particularly to the field of multi-point fuel injectors for an aircraft engine.

PRIOR ART

For some years, European directives have imposed on the aeronautical sectors a reduction in the levels of nitrogen oxides (NOx) emitted by aircrafts.

To reduce the emission of NOx in aircrafts, it is known to use a multi-point fuel injection device, i.e. an injection device delivering fuel over two injection lines leading to the engine. Such an injection device typically comprises a fuel injection member making it possible to distribute a flow of fuel entering over one and/or the other of the fuel injection lines, so as to have better uniformity of the air/fuel mixture in the engine and therefore better combustion, which makes it possible to reduce pollutants.

The distribution of the flow of fuel between the two injection lines is adjusted by means of a movable element, generally controlled by a first actuator and a first sensor. The distribution carried out depends on the different flight parameters and, in a certain number of situations, such as during starting or idling on the ground or in flight for example, only a first determined injection line (generally called the "pilot" line) is allowed to deliver, and the second injection line must be shut off.

Moreover, depending on the architectural choices and depending on the engine, it may be decided that this second injection line should be drained of the stagnating fuel that it contains when the second line is shut off, so as to eliminate coking of the stagnating fuel in this second injection line.

Likewise, certain injection devices comprise, instead of the distributor, an additional purge member designed to trigger the purging of the second injection line.

However, the purge member and the distributor must be controlled in perfect synchronism. Indeed, the purge member may only trigger a purging of the second injection line when this second line is not receiving fuel from the distributor, failing which fuel injection will be perturbed in flight.

Moreover, the addition of this additional purge member into an injection device increases the dimensions of this device.

The injection device described in document US 2012/0159953 attempts to compensate for these drawbacks by means of an element that is movable between positions allowing purging and/or fuel injection to be implemented.

However, the movable element of such a device can be subject to failures and thus be blocked in a position that is detrimental to the operation of the engine.

A first consequence of such a failure can be the risk of combustion of the fuel collected during past purges.

A second consequence is insufficient fuel injection in terms of flow into the engine, not allowing the engine to keep the aircraft in flight.

PRESENTATION OF THE INVENTION

One goal of the invention is to reduce the risks caused by desynchronized implementation of the multi-point injection operation and the purge operation.

Another goal of the invention is to reduce the dimensions of an injection device which provides the functions of multi-point injection and purging.

Yet another goal is to avoid, in the event of failure of such an injection device, risks of combustion of the fuel collected during past purges and insufficient thrust of the engine receiving the fuel.

A multi-point fuel injection device is therefore proposed for an aircraft engine, comprising an intake line, at least two injection lines and a purge line, a fuel distributor connected to each line and comprising a movable element which includes an injection passage and a purge passage, and which is configured to assume:

a first range of positions wherein the injection passage interconnects the intake line and the injection lines, and
a second range of positions wherein the injection passage interconnects the intake line and at least one first injection line while the purge passage interconnects the purge line and at least one second injection line, the device further comprising an actuator designed to move the movable element into a safety position upon detecting a failure of the distribution member, the injection passage interconnecting, in this safety position of the movable element, the intake line of at least one of the injection lines while the purge passage does not interconnect the purge line to any of the injection lines.

When the movable element of the device thus proposed occupies a position contained within the first range, the distributor implements multi-point injection distributed between different injection lines when the fuel is received from the intake line.

And when the movable element occupies a position contained in the second range, the distributor simultaneously implements injection toward at least one injection line and allows purging of the second line. The presence of the two passages in the movable element then makes it possible to guarantee that the intake line cannot supply fuel to the second injection line while its content is drained off to the purge line.

The operations of multi-point injection and purging are thus advantageously combined in a single distributor, and selectively activated by the simple movement of the movable element between the first and second position ranges, thus preventing the de-synchronization risks previously mentioned.

Moreover, in the safety position, the purge line cannot receive fuel from any injection line; the fuel already collected can therefore not ignite.

Furthermore, in the safety position, at least one of the injection lines receives fuel from the intake line, through the injection passage. The supply of fuel is thus guaranteed so as to avoid a loss of thrust of the engine receiving the fuel.

Moreover, the injection device according to the invention is simple to implement, and occupies less space than the injection devices according to the prior art.

The injection device can comprise a single sensor designed to measure the position of the movable element, and a single actuator to move the movable element, the sensor and the actuator being connected to one controller comprised within the engine, or more generally within the aircraft. The injection devices of the prior art comprising a distinct purge member and distributor can be controlled by such a controller only with a minimum of two actuators and two position sensors. However, such a controller generally has only a limited number of connection ports with equipment to be controlled. The injection device according to the invention therefore requires fewer connection ports of such a controller, compared to the prior art injection devices, and makes it possible to free a large number of such ports for controlling other equipment by such a controller.

Moreover, the injection device proposed is easy to manufacture and uses little space in the engine compared to a device comprising distinct distributor and purge members.

The injection passage can be designed to interconnect the intake line and only the first injection line when the movable element assumes the safety position.

The use of only one of the two injection lines is required during starting and during idling on the ground or during the flight of an aircraft. Consequently, the safety position thus configured makes it possible to overcome a failure of the injection device in these particular phases of flight.

The intake line can be terminated by an intake port leading entirely into the injection passage when the movable element assumes the safety position. The first injection line can further be terminated by an injection port leading entirely into the injection passage when the movable element assumes the safety position.

These features have the effect of increasing the flow of fuel delivered to the engine in the safety position, and thus to also decrease the risks of engine thrust loss in the event of a failure of the injection device.

The movable element can be configured to assume a third range of positions wherein the injection passage interconnects the intake line with only the first injection line, and wherein the purge passage does not interconnect the purge line with any of the injection lines.

The movable element can be a drawer sliding in a sheath along a longitudinal axis and, in the safety position, the drawer can abut against a bottom of the sheath.

The injection lines can be two in number and each be terminated by an injection port leading into the sheath, the injection passage can extend transversely to the longitudinal axis and include a width along said axis which is equal to the sum of the length along said axis separating the closest edges of the two injection ports and the diameter of the two injection ports along said axis, the two ports having the same diameter.

Moreover, the intake line can be terminated by an intake port leading into the sheath at a longitudinal position which is comprised between the respective longitudinal positions of the injection ports, the diameter of the injection passage along the longitudinal axis being greater than the diameter of the intake port along said axis.

The purge line can further be terminated by a purge port leading into the sheath, the closest edges of the intake and purge ports being separated by a distance along the longitudinal axis which is greater than the diameter of the injection passage along said axis.

The drawer can comprise a median portion separating the injection and purge passages, the length of the median portion along the longitudinal axis being greater than the diameter of each injection port along said axis and less than the distance separating the closest edges of the two injection ports along said axis.

The length of the median portion along the longitudinal axis can further be less than the distance along said axis separating the intake port from the injection port that terminates the second injection line.

Also proposed, within the scope of the invention, is an aircraft engine comprising at least one injection device such as previously described.

DESCRIPTION OF THE FIGURES

Other features, goals and advantage of the invention will be revealed by the description that follows, which is purely illustrative and not limiting, and which must be read with reference to the appended drawings wherein.

In all the figures, similar elements have identical references.

DETAILED DESCRIPTION OF THE INVENTION

Figure 1:
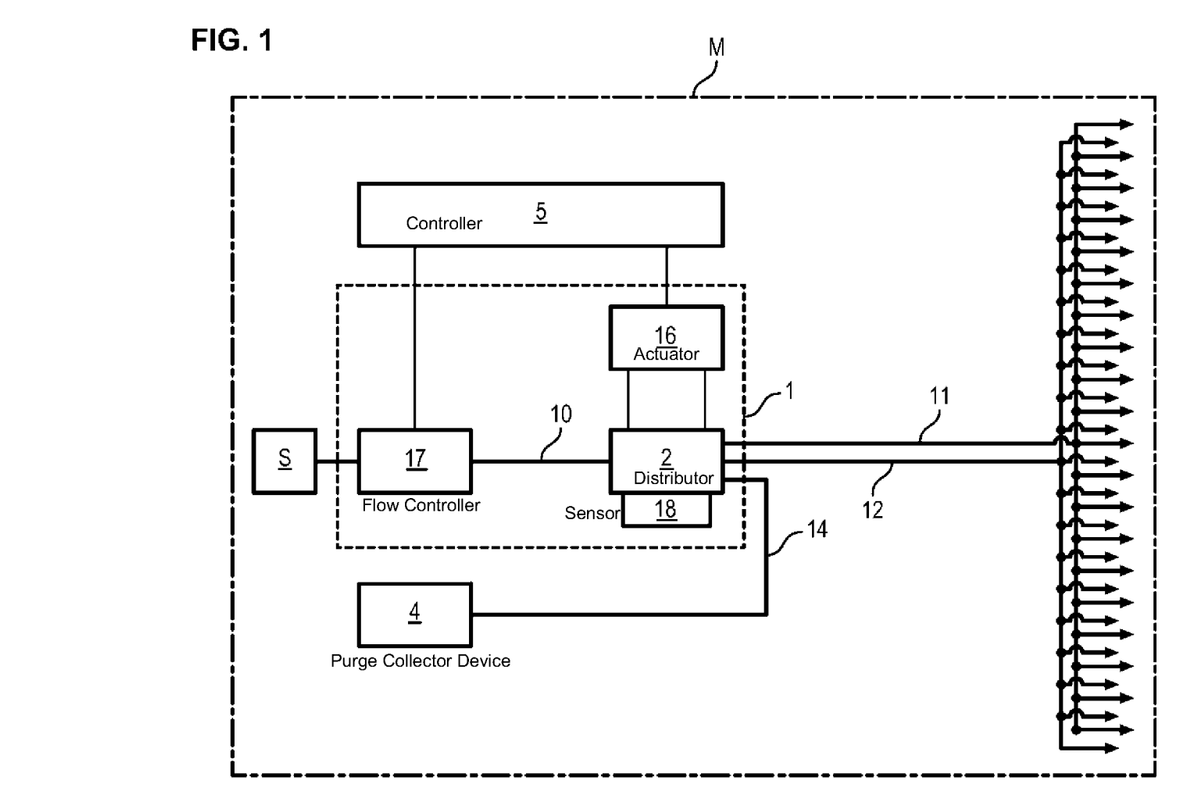
FIG. 1 shows schematically a fuel circuit of an aircraft engine comprising a fuel injection device according to one embodiment of the invention.

With reference to FIG. 1, an aircraft engine M comprises a multi-point fuel injection device 1.

The injection device 1 comprises a distributor 2 connected to an intake line 10, to two injection lines 11, 12 and to one purge line 14.

Each line 10, 11, 12, 14 is a pipe designed to carry fuel.

The intake line 10 includes an upstream end designed to be connected to a fuel source S and a downstream end connected to a first port of the distributor 2.

Each injection line includes an upstream end connected to a respective injection port of the distributor 2. Each injection line 11, 12 can also comprise a plurality of downstream ends each terminated by a nozzle.

The first injection line 11 called the "pilot" injection line is provided to deliver a constant fuel flow optimized for low power settings.

The second injection line 12, called the "main" injection line delivers an intermittent fuel flow optimized for high power settings. These two lines 11, 12 were developed to allow a better adaptation of the injection of air and fuel at different operating regimes of the combustion chambers, so as to reduce their pollutant emissions, such as nitrogen oxides, and smoke.

The purge line 14 includes an upstream end connected to a purge port 204 of the distributor 2, and a downstream end designed to be connected to a purge collector device 4.

The distributor 2 comprises an element movable between several configurations, which will be described hereafter.

The injection device also includes an actuator 16, for example of the hydraulic type, designed to move the movable element, and a position sensor 18 for this movable element, for example a sensor 18 of the LVDT (linear variable differential transformer) type. The actuator 16 and the position sensor 18 can be integrated or not with the distributor 2.

The position sensor 18 is connected to a respective port of a controller 5 and is designed to communicate to it the current position of the movable element in the distributor 2.

The actuator 16 is connected to another port of the controller 5.

The controller 5 is designed to control the movement of the movable element based on a distribution command and a purge command.

The controller 5 can be integrated in the injection device 1, or be external to it (the unit can for example be a calculator integrated into the engine M, as shown in FIG. 1, or be a calculator of an aircraft connected not only to the injection device 1 but also to other equipment of this aircraft).

The injection device 1 can also include on the intake line 10 a flow controller 17 positioned upstream of the distributor 2. The flow controller 17 is designed to supply the distributor 2 with a flow of fuel at a controlled rate. This flow rate can for example be determined by the controller 5.

Figure 2A:
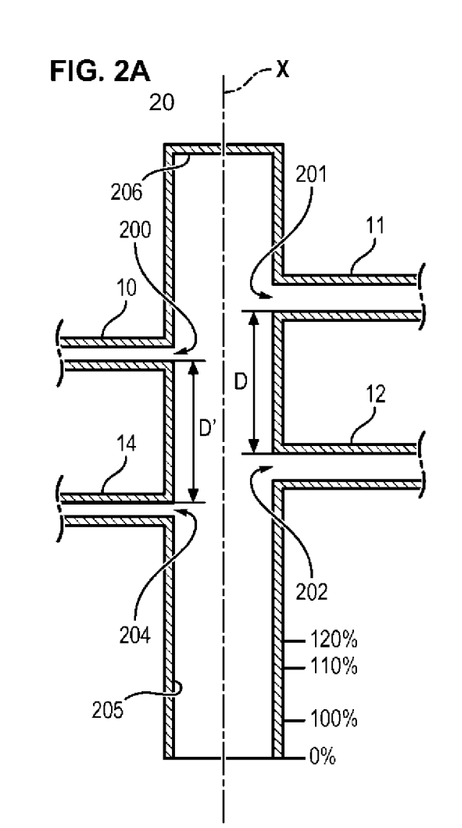
FIGS. 2A and 2B are partial section views of two respective elements of a distributor according to one embodiment and comprised in the injection device of FIG. 1.
Figure 2B:
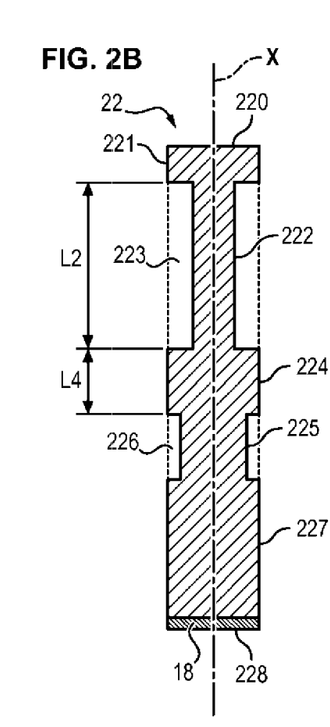

With reference to FIGS. 2A and 2B, the distributor 2 includes a sheath 20, and the movable element is a drawer 22 movable in translation in the sheath 20 along a longitudinal axis X.

The sheath 20 comprises an inner wall 205 defining a cylindrical cavity, the generators whereof are parallel to the longitudinal axis X, and a bottom 206. In the inner wall 205 are formed the intake 200, injection 201, 202 and purge 204 ports.

By convention, all the lengths and diameters mentioned in what follows are explicitly measured parallel to the longitudinal axis X, unless the contrary is stated.

Moreover, the injection port closest to the bottom 206 of the sheath 20 will be called the first injection port 201, and the farthest from the bottom 206 of the sheath 20 will be called the second injection port 202.

The two injection ports 201, 202 are centered on a first generator of the wall, and the intake 200 and purge 204 ports are centered on a second generator of the wall opposite the first generator with respect to the longitudinal axis X, the purge port 204 being farthest from the bottom 206 than the intake port 200.

The drawer 22 includes a first end 220 facing the bottom 206 of the sheath 20, and a second end 228 opposite to the first end 220.

The position sensor 18 of the injection device 1 (illustrated in FIG. 1) is housed in the drawer 22 at the second end 228. The actuator 16 of the injection device (also illustrated in FIG. 1) can also be attached to the second end 228.

The drawer 22 includes two distinct passages designed to carry fuel in a direction transverse to the drawer 22 perpendicular to the longitudinal axis X: an injection passage 223 and a purge passage 226.

The drawer 22 includes the following five successive portions along the longitudinal axis X:
 a first terminal portion 221 terminating with the first end 220 of the drawer 22 facing the bottom 206,
 a first intermediate portion 222 extending the first terminal portion 221 and defining the injection passage 223,
 a median portion 224 extending the first intermediate portion 222,
 a second intermediate portion 225 extending the median portion 224 and defining a purge passage 226, and
 a second terminal portion 227 extending the second intermediate portion 225 and terminating with the second end 228 of the drawer 22.

The terminal portions 221, 227 and the median portion 224 have a so-called "external" cross-section which is substantially complementary to the cross-section of the cavity of the sheath 20. The person skilled in the art will understand by "substantially complementary cross-section" a section designed to prevent leakage of fuel between the shell of the drawer 22 and the cavity of the sheath 20, at the portions 221, 224 and 227.

The first intermediate portion 222 of the drawer 22 has a smaller section than the external section, centered for example on the axis X. The annular gap left between the first intermediate portion 222 and the wall of the sheath 20 then defines the injection passage 223.

The first intermediate portion extends over a length which is greater:
 than the diameter D1 of the first injection port 201,
 than the diameter D2 of the second injection port 202,
 than the diameter of the intake port 200; and
 than the distance between the nearest edges of the two injection ports 201, 202.

The second intermediate portion 225 of the drawer 22 has a cross section that is also smaller than the external section of the drawer 22, centered for example on the axis X. The annular gap left between the second intermediate portion 225 and the wall of the sheath 20 then defines a purge passage 226.

The median portion 224 of the drawer 22 isolates the two passages from one another.

The median portion 224 has a length L4 along the longitudinal axis X greater than the diameter D2 of the second injection port 202.

The median portion 224 has moreover a length L4 along the longitudinal axis X less than the distance along the longitudinal axis X between the closest edges of the intake port 200 and the second injection port 202.

The longitudinal distance D' between the closest edges of the intake port 200 and the purge port 204 is greater than the length L2 of the first intermediate portion 222.

The distributor 2 of the injection device 1 can be configured in several configurations by sliding the drawer 22 in the sheath 20 along the axis X, each configuration corresponding to a specific range of positions of the drawer 22 in the sheath 20. These configurations will now be detailed with reference to FIGS. 3 to 7.

By convention, the position of the drawer 22 is implicitly the position measured by the position sensor 18.

Moreover, the terms "connection" or "interconnection" used hereafter for the passages and lines of the injection device 1 implicitly designate a connection of pipes allowing passage of fuel.

Multi-point Injection Configuration

Figure 3:
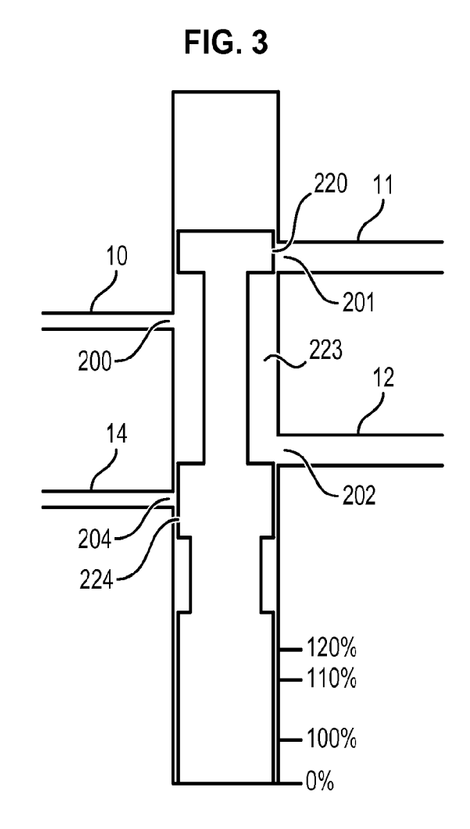
FIG. 3 is a section view of a distributor comprising the elements illustrated in FIGS. 2A and 2B and configured in a first configuration.
Figure 4:
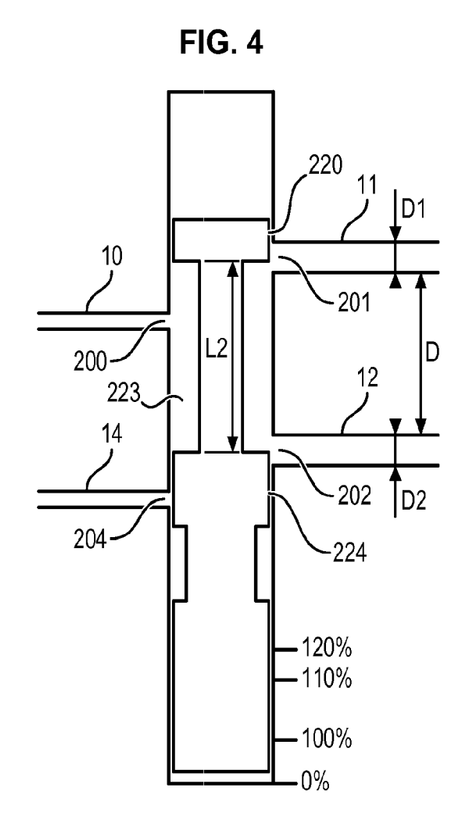
FIG. 4 is a section view of the distributor of FIG. 3, configured in a second configuration.

In one range of positions of the drawer 22, called multi-point injection, the injection passage 223 interconnects the intake port 200 with the injection lines 11, 12 as illustrated in FIGS. 3 and 4.

More precisely, in each position of this multi-point injection range, the entirety of the intake orifice 200 leads into the injection passage 223, and at least a portion of at least one of the injection ports 201, 202 also leads into the injection passage 223.

The multi-point injection range is bounded by two positions of the drawer 22 referred to respectively as 0% and 100%.

FIG. 3 shows the 0% position of the drawer 22, and FIG. 4 shows a position of the drawer 22 comprised between 0 and 100%.

The length L2 of the first intermediate portion 222 (corresponding to the diameter of the injection line 223) and the diameter of the two injection ports 201, 202 are designed so that, in any position x of the multi-point injection range, x % of a total flow rate of fuel leading into the injection passage 223 through the intake port 200 is delivered by the first injection line 11 while (100-x) % of this total flow rate is delivered into the second injection line 12. The length L2 can be equal to the sum of the length D separating the closest edges of the two injection ports and the diameter of one of the two injection ports.

As the median portion 224 of the drawer 22 has a greater length than the diameter of the second injection port 202, this second injection orifice 202 cannot lead into the purge passage 226. Consequently, in each position of the multi-point injection range, the purge passage 226 is not connected to any of the injection lines 11, 12.

Moreover, the purge port 204 does not lead into the injection passage 223, which prevents redirection of a fuel flow entering the injection passage 223 through the intake port 200 toward the purge port 204.

Single Injection Configuration

Figure 5:
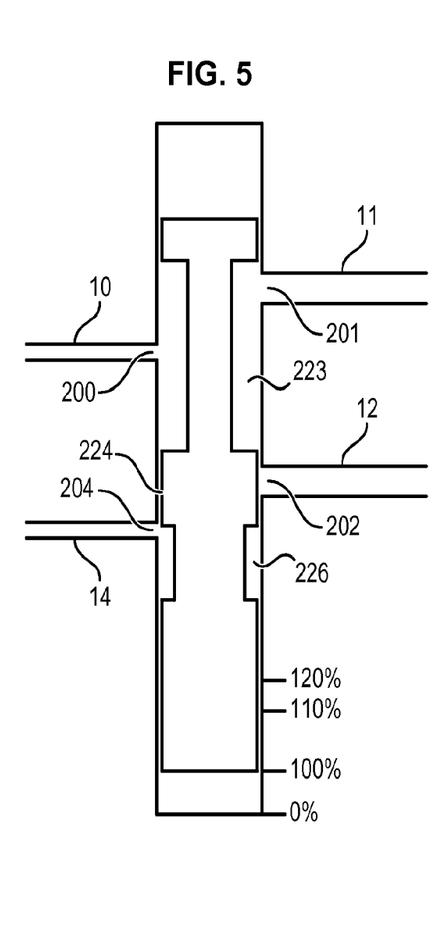
FIG. 5 is a section view of the distributor of FIG. 3, configured in a third configuration.

In one range of positions of the drawer 22, called single injection, the injection passage 223 interconnects the intake port 200 with only one of the injection lines 11, 12 as illustrated in FIG. 5.

FIG. 5 shows the position of the drawer 22 referred to as 100% comprised in the single injection range.

This single injection range is related to the double injection range; the drawer 22 therefore passes from the double injection range into the single injection range by moving the drawer 22 closer to the bottom 206 of the sheath 20, as soon as the entirety of the second injection port 202 is obstructed by the median portion 224 of the drawer 22.

This simple injection range is not reduced to a single position due to the fact that the length L4 of the median portion 224 is greater than the diameter of the injection port 202.

In each position of this single injection range, the entirety of the intake port 200 and the entirety of the first injection port 201 lead into the injection passage 223.

Thus, a fuel flow coming from the intake line 10 can penetrate into the injection passage 223 through the intake port 200 and depart from it by the first injection port 201 without a reduction in flow rate.

The drawer 22 of the injection device 1 can be advantageously configured in the single injection range in certain phases of flight of the aircraft in which it is used, like the starting of the aircraft or a ground idle phase.

Purge Configuration

Figure 6:
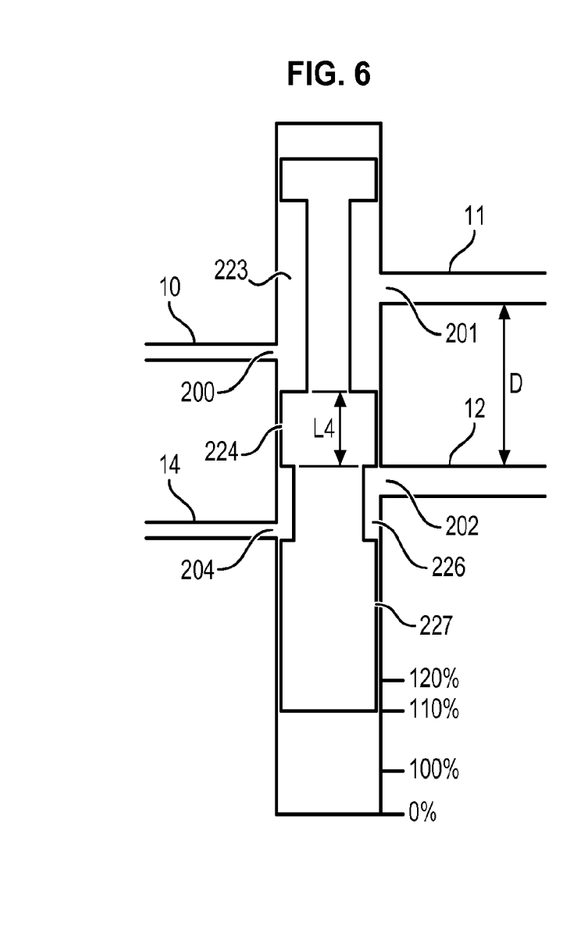
FIG. 6 is a second view of the distributor of FIG. 3, configured in a fourth configuration.

In one range of so-called purge positions of the drawer 22, the injection passage 223 interconnects the intake port 200 with the first injection port 201, and the purge passage 226 interconnects the second injection port 202 and the purge port 204.

FIG. 6 shows a position of the drawer 22 referred to as 110% comprised within the single injection range.

This purge range is related to the single injection range; the drawer 22 passes from the single injection range to the purge range by moving the drawer 22 even closer to the bottom 206 of the sheath 20, as soon as at least a portion of the second injection port 202 leads into the purge passage 226 and that at least a portion of the purge port 204 also leads into the purge passage 226.

As the median portion 224 has a length along the axis less than the longitudinal distance between the closest edges of the intake port 200 and the second injection port 202, there exists at least one position of the drawer 22 included in the purge range wherein the entirety of the intake port 200 leads into the injection passage 223, and wherein the entirety of the second injection port 202 leads into the purge passage 226: 100% of a flow coming from the intake line 10 can then be conveyed to the first injection line 11 without the drawer 22 causing a reduction in the rate of this flow.

Moreover, fuel stagnating in the second injection line 12 can be exhausted through the purge line 14 after having passed through the purge passage 226.

The stagnating fuel can be automatically evacuated through the purge line 14 thanks to a pressure differential between the purge line 14 and the second injection line 12 and/or by mere gravity.

Safety Configuration

Figure 7:
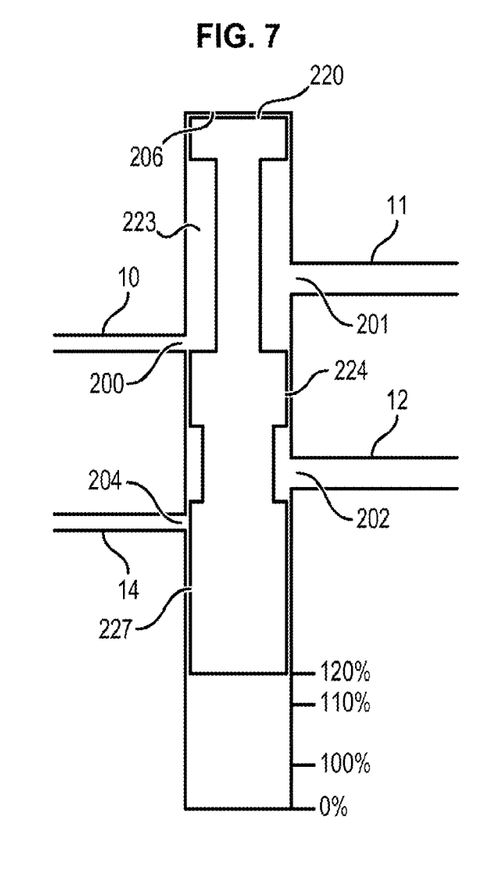
FIG. 7 is a section view of the distributor of FIG. 3, configured in a fifth configuration.

In one range of so-called safety positions of the drawer 22, the injection passage 223 interconnects the intake port 200 with the first output port, and the purge passage 226 does not interconnect the second injection port 202 and the output port.

FIG. 7 shows a position of the drawer 22 referred to as 120% comprised in the safety range.

This safety range is related to the purge range; the drawer 22 passes from the purge range into the safety range by moving the drawer 22 still closer to the bottom 206 of the sheath 20, as soon as the purge port 204 or the second injection port 202 no longer leads into the purge passage 226 but is obstructed by the second terminal portion 227 (in the embodiment illustrated, it is the purge port 204 which is obstructed by the terminal portion 227).

This safety range comprises in particular an extreme position of the drawer 22 in the sheath 20 (this is the position illustrated in FIG. 7): this extreme position of the drawer 22 is attained when the first end 220 of the drawer 22 comes into abutment against the bottom 206 of the sheath 20.

Just like the single injection range, the safety range makes it possible to redirect a fuel flow coming from the intake line 10 to the first output line and not to implement any purging of the second injection line 12.

This safety range is advantageous when a loss of control of the movement of the drawer 22 in the sheath 20 occurs (caused for example by a failure of the position sensor 18).

When such a loss of control is detected, the drawer 22 will naturally (by equilibrium of the forces implemented) go to its extreme position, so as to guarantee single injection through the first injection line 11 into the engine while preventing purging of the second injection line 12. This equilibrium of the thrust forces can for example be implemented by a spring comprised inside the actuator 16.

One of the goals of the safety position range is to minimize the deterioration of the engine caused by a failure of the injection device.

First of all, only one of the two injection lines is used (the first, or "pilot" line) in the safety position. The use of only one of the two injection lines is required during starting or ground or air idling of an aircraft. Consequently, the safety position thus configured makes it possible to overcome a failure of the injection device in these particular phases of flight.

Secondly, any purging is prevented in the safety position because very hot air from the combustion chamber would then be brought into the purge member connected to the fuel circuit. There could be a risk of fire, a risk much more detrimental than possible coking in the injection lines within a context of failure of the injection device.

Thirdly, it is appropriate, in the safety position, to avoid having the engine flame out despite the fact that only one of the two injection lines is in use (in this case the "pilot" line). That is the reason why, in each position of this safety range, the entirety of the intake port 200 and the entirety of the first injection port 201 lead into the injection passage 223. This makes it possible in fact for the injection passage to transmit a maximum flow rate coming from the intake line to the first injection line ("pilot" line).

The controller 5 can determine a piloting command of the actuator 16 so as to move the drawer 22 in the sheath 20 toward one or the other of the ranges previously presented.

This command can be elaborated based on two instructions: a distribution instruction, and a purge instruction.

The distribution instruction can for example be a ratio of the total flow rate (between 0% and 100%) to be supplied to one of the injection lines 11, 12, for example the first injection line.

The purge instruction can be a Boolean indicating whether or not a purge of the second injection line 12 should be triggered.

Other Embodiments

The multi-point injection device according to the invention is not limited to the embodiment described previously with reference to the appended drawings.

The injection and purge passages can be constructed in other ways than using portions with reduced cross-sections: for example, by longitudinally extending slots, allowing the passage of fuel in a substantially transverse direction.

The injection and purge passages can be straight or have more complex profiles, comprising elbows or curves.

The position sensor 18 of the device may be accommodated at other places in the drawer 22.

The intake, purge and injection ports can have identical or different dimensions.

The intake, purge and injection ports can also have circular or non-circular cross-sections (the term diameter used in the foregoing description is in this case to be taken in the sense of an average diameter).

The movable element 22 of the injection device 1 is not limited to a drawer 22 sliding in a sheath 20. In a variant, not illustrated, the movable element 22 can be rotatably movable with respect to a support element of the distributor 2, the ports being provided with respect to one another in the support element at angles suited to ensure the interconnections (and the absence of interconnections) previously described. The injection device 1 can then pass from one configuration to another by rotation of this movable element 22 with respect to the support element.

The injection device 1 can further comprise more than two injection lines 11, 12, of which at least one can be purged through interconnection with a purge line.

The invention claimed is:

1. A multi-point fuel injection device for an aircraft engine, comprising:
   an intake line, first and second injection lines, and a purge line;
   a fuel distributor connected to each line and comprising a movable element which includes an injection passage and a purge passage, the movable element being configured to assume:
      a first range of positions wherein the injection passage interconnects the intake line and the first and second injection lines, and
      a second range of positions wherein the injection passage interconnects the intake line and the first injection line while the purge passage interconnects the purge line and the second injection line; and
   an actuator configured to move and secure the movable element into a safety position when a failure of the fuel distributor is detected, the injection passage interconnecting, in said safety position of the movable element, the intake line and at least one of the first and second injection lines while the purge passage does not interconnect the purge line with any of the first and second injection lines.

2. The fuel injection device according to claim 1, wherein the injection passage interconnects the intake line and only the first injection line when the movable element assumes the safety position.

3. The fuel injection device according to claim 1, wherein the intake line is terminated by an intake port leading entirely into the injection passage when the movable element assumes the safety position.

4. The fuel injection device according to claim 1, wherein the first injection line is terminated by an injection port leading entirely into the injection passage when the movable element assumes the safety position.

5. The fuel injection device according to claim 1, wherein the movable element is configured to assume a third range of positions wherein the injection passage interconnects the intake line with only the first injection line, and wherein the purge passage does not interconnect the purge line with any of the two injection lines.

6. The fuel injection device according to claim 1, wherein the movable element is a drawer sliding in a sheath along a longitudinal axis and wherein, in the safety position, the drawer comes into abutment against an end of the sheath.

7. The fuel injection device according to claim 6, wherein the injection lines are two in number and are each terminated by an injection port leading into the sheath, the injection passage extending transversely to the longitudinal axis and includes a width along said axis which is equal to the sum of the length along said axis separating the closest edges of the two injection ports and a diameter of the two injection ports along said axis, the two ports having the same diameter.

8. The fuel injection device according to claim 6, wherein the injection lines are two in number and are each terminated by an injection port leading into the sheath, wherein the intake line is terminated by an intake port leading into the sheath at a longitudinal position which is comprised between the respective longitudinal positions of the injection ports, the injection passage having a length along the longitudinal axis which is greater than a length of the intake port along said longitudinal axis.

9. The fuel injection device according to claim 6, wherein the intake line is terminated by an intake port leading into the sheath and wherein the purge line is terminated by a purge port also leading into the sheath, the closest edges of the intake and purge ports being separated by a distance along the longitudinal axis which is greater than a length of the injection passage along said longitudinal axis.

10. The fuel injection device according to claim 6, wherein the injection lines are two in number and are each terminated by an injection port leading into the sheath, wherein the drawer includes a median portion separating the injection and purge passages, the length of the median portion along the longitudinal axis being greater than the diameter of each injection port along said longitudinal axis and less than a distance separating closest edges of the two injection ports along said longitudinal axis.

11. The fuel injection device according to claim 10, wherein the length of the median portion along the longitudinal axis is further less than the distance along said longitudinal axis separating the intake port and the injection port that terminates the second injection line.

12. An aircraft engine comprising at least one multi-point fuel injection device according to claim 1.

13. The aircraft engine according to claim 12, wherein the first injection line is designed to deliver a constant fuel flow optimized for low engine power settings, and the second injection line is designed to deliver an intermittent fuel flow optimized for high engine power settings.

14. The fuel injection device according to claim 1, further comprising:
- a controller which controls movement of the movable element based on a distribution command and a purge command; and
- a sensor which detects a position of the movable element in the fuel distributor.

15. The fuel injection device according to claim 14, wherein the sensor is provided on an end of the movable element,
- wherein the end of the movable element is closer to the purge passage in the second range of positions than in the first range of positions, and
- wherein the end of the movable element is closer to the purge passage in the safety position than in the second range of positions.

16. The fuel injection device according to claim 1, wherein the safety position of the movable element, the injection passage interconnects the intake line and the first injection line.

* * * * *